Figure 1:
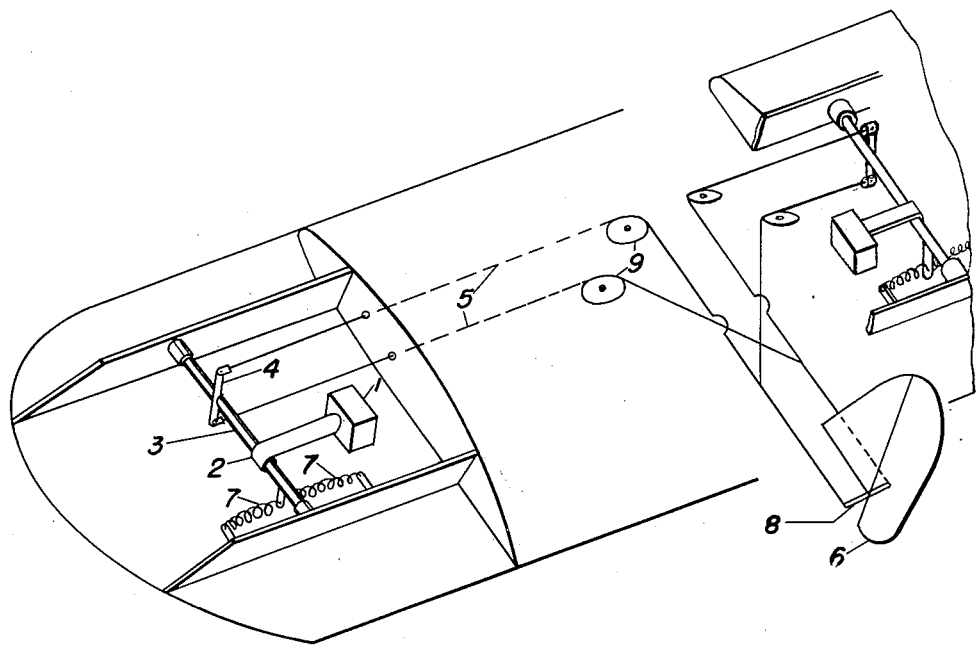

June 6, 1950 J. M. NISSEN 2,510,133
MEANS FOR OBTAINING RUDDER CONTROL
Filed Aug. 18, 1945

Inventor
James M. Nissen

By Ralph L Chappell
Attorney

Patented June 6, 1950

2,510,133

UNITED STATES PATENT OFFICE 2,510,133

MEANS FOR OBTAINING RUDDER CONTROL

James M. Nissen, Los Altos, Calif.

Application August 18, 1945, Serial No. 611,433

3 Claims. (Cl. 244—80)

(Granted under the act of March 3, 1883, as amended April 30, 1928; 370 O. G. 757)

This invention pertains to means for obtaining rudder control on a two control airplane and especially for light airplanes.

Essentially the invention consists of a weight or weights located in the wing tips of an airplane and actuated by inertia and centrifugal force so that when the airplane is rolled as in entering a turn the rudder is actuated in a direction which keeps the angle of adverse yaw to a low value.

The basic principle of the invention is to utilize the centrifugal force produced by rolling velocity of the airplane to apply a force to the rudder and to use the rolling acceleration to determine the application of the rudder force; that is, whether left or right rudder force is applied.

The object of this invention is that it permits a lower rudder fixed directional stability than is possible in an ordinary two control airplane in which high directional stability is used to overcome adverse aileron yaw effect. The advantage of having low directional stability is that in normal straight flight the airplane is not yawed as much as side gusts, and it is therefore easier to maintain a given course. Since there is a unit located in each wing tip, normal acceleration would have no effect as long as the stretch in the system was kept to a low value.

Details of the invention are described in connection with the following drawing in which the single figure is a diagrammatic view showing the weight mounted in one of the wing tips to operate the rudder.

In the figure weight 1 is attached to arm 2 which in turn is affixed to shaft 3 journaled in suitable bearings in the wing tip. The motion of the weight and arm is transmitted to rudder 6 through a mechanical system of pulleys. Bar 4 is affixed to shaft 3 and bar 8 is attached to rudder 6. These bars are connected by means of cables which operate in sheaves 9, as shown. When the airplane rolls left the weight swings upwardly due to inertia and outwardly towards the wing tip due to centrifugal force thereby in effect applying left rudder. The reverse applies when the airplane rolls right. The weight and arm are centered by means of springs 7, as shown.

The unit is duplicated in the other wing.

As already indicated, during maneuvers involving entering into or leaving a turn, when the airplane is rolling as a result of aileron displacement, the present device will automatically apply the correct direction and amount of rudder movement to keep the angle of sideslip to a minimum. The acceleration of the wing tips in a rolling motion of the airplane will displace the weights from their normal positions on a transverse line between the shafts 3 in the wing tips. This determines the proper direction in which the rudder is to be turned. Thereafter, during the roll, centrifugal forces acting on the weights in accordance with the velocity of the roll will add to the torque on shafts 3 in the same direction as that resulting from the inertia due to the original acceleration, and the two torques will control the rudder operating forces and displacement in accordance with the sum of these torques. Obviously, with a higher velocity of roll, the rudder will be moved with a greater force and to a greater degree during the roll. At the end of the roll, the rudder is automatically returned to normal position, and on reverse roll the rudder is automatically operated in a like manner in the reverse direction. By proper design of the arms, springs and weights, therefore, a correct variation of the force applied to the rudder with relation to the variation in the velocity of the roll is obtained.

In the mechanical system shown the arm and weight will probably have to swing into the airstream. This action might be of advantage, as appropriately shaped arms and weights could be used to produce favorable yaw to thereby increase the force applied on the rudder.

The rolling acceleration may be utilized to determine the direction of application of rudder force by either using mechanical or hydraulic means. In using a hydraulic device, the entire device could be housed within the wing.

The invention described herein may be manufactured and used by or for the Government of the United States of America for governmental purposes without the payment of any royalties thereon or therefor.

Having described my invention, I claim:

1. An automatic rudder control for airplanes comprising a rotatable shaft mounted near each wing tip parallel to the axis of flight, an arm fixed on said shaft normally positioned to point to the wing root, a weight on the end of said arm, controls connecting each of said shafts with the rudder whereby rotation of said shafts due to movement of said weights in response to rolling of the airplane actuates said rudder.

2. The device described in claim 1 in which the weight is restrained in normal position by at least one spring.

3. In an airplane having a fuselage, wings and rudder, a control to prevent side slipping comprising a spring-biased weight in each wing movably positioned on a pivoted arm normally extending spanwise of said wing, and control elements connecting said weights with the rudder whereby movement of said weights due to inertia and centrifugal forces resulting from rolling of the airplane controls the rudder to prevent side slipping.

JAMES M. NISSEN.

REFERENCES CITED

The following references are of record in the file of this patent:

UNITED STATES PATENTS

| Number | Name | Date |
|---|---|---|
| 1,174,679 | Carroll | Mar. 7, 1917 |
| 1,239,636 | Tarbox | Sept. 11, 1917 |
| 2,076,088 | Malinowski | Apr. 6, 1937 |
| 2,196,385 | DeFlorez et al. | Apr. 9, 1940 |
| 2,211,267 | Hess | Aug. 13, 1940 |
| 2,270,875 | Hanson et al. | Jan. 27, 1942 |

FOREIGN PATENTS

| Number | Country | Date |
|---|---|---|
| 787,851 | France | July 16, 1935 |